(12) United States Patent
McCarty et al.

(10) Patent No.: US 8,483,346 B2
(45) Date of Patent: Jul. 9, 2013

(54) NUCLEAR REACTOR CONTROL ROD SPIDER ASSEMBLY

(75) Inventors: Jeffrey M. McCarty, Cayce, SC (US); Jim Sparrow, Irmo, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 1641 days.

(21) Appl. No.: 11/735,612

(22) Filed: Apr. 16, 2007

(65) Prior Publication Data

US 2008/0253496 A1    Oct. 16, 2008

(51) Int. Cl.
*G21C 7/06*    (2006.01)
(52) U.S. Cl.
USPC .......................................... 376/225; 376/327
(58) Field of Classification Search
USPC ................................................ 376/327, 225
See application file for complete search history.

(56) References Cited

U.S. PATENT DOCUMENTS

| | | | |
|---|---|---|---|
| 4,314,885 A | | 2/1982 | Edwards et al. |
| 4,381,283 A | | 4/1983 | Walton |
| 4,855,100 A | * | 8/1989 | Shallenberger et al. ...... 376/327 |
| 4,888,151 A | * | 12/1989 | Gjertsen et al. ............... 376/327 |
| 5,141,711 A | | 8/1992 | Gjertsen et al. |
| 5,608,768 A | * | 3/1997 | Matzner et al. ............... 376/451 |
| 5,669,729 A | * | 9/1997 | Attix ............................. 403/282 |
| 5,711,629 A | * | 1/1998 | Attix ............................. 403/320 |
| 6,636,580 B2 | | 10/2003 | Murakami et al. |

\* cited by examiner

*Primary Examiner* — Timothy A Brainard

(57) ABSTRACT

A control rod spider assembly connection between a connecting finger and a rodlet. An upper end plug of the rodlet is secured to the inner bore of the hollow connecting finger with a mating one of a right hand or left hand thread interfacing between the interior of the bore and the circumference of the rodlet. The upper end of the rodlet is captured by a second fastener mechanism having the other of the right hand or the left hand thread. The second fastener mechanism is anchored to one or both of the connecting finger or the upper end plug to secure the connection.

10 Claims, 5 Drawing Sheets

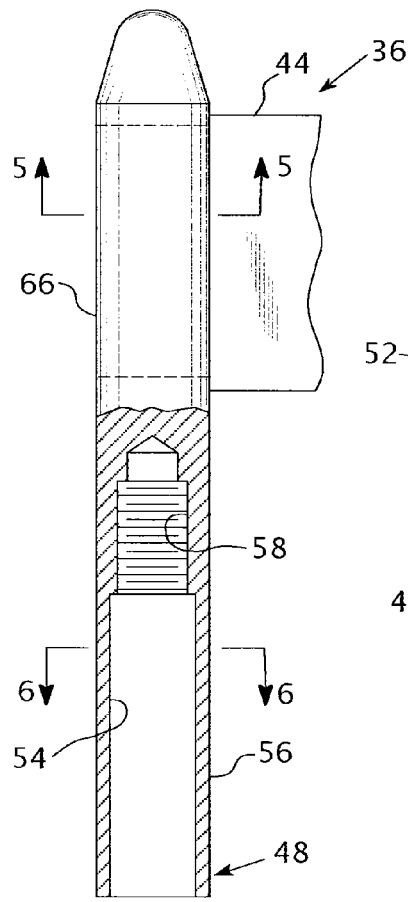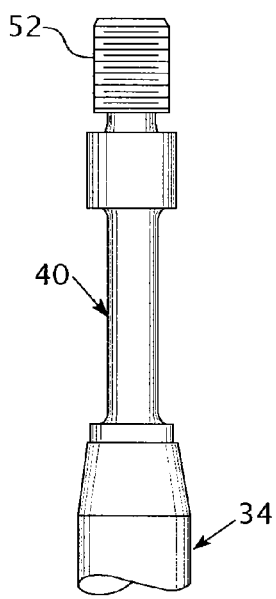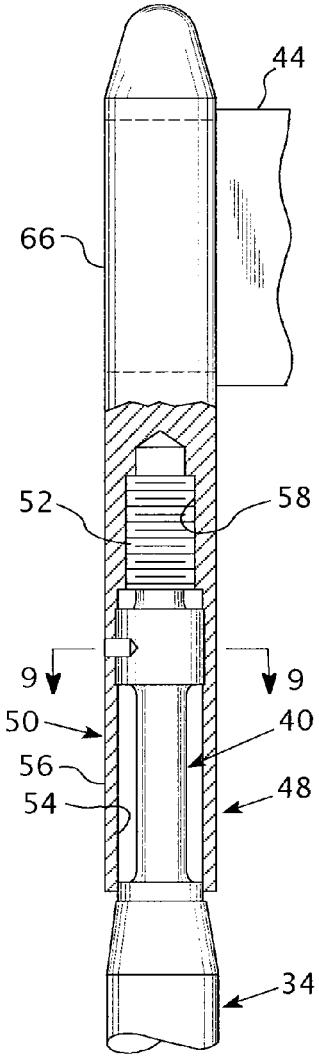
FIG. 4
(Prior Art)
FIG. 7
(Prior Art)
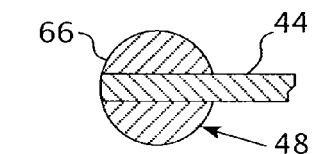
FIG. 5
(Prior Art)
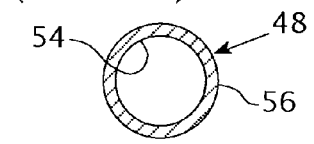
FIG. 6
(Prior Art)
FIG. 8
(Prior Art)
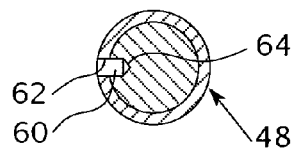
FIG. 9
(Prior Art)

NUCLEAR REACTOR CONTROL ROD SPIDER ASSEMBLY

BACKGROUND OF THE INVENTION

1. Field of the Invention

The present invention relates generally to nuclear reactors and, more particularly, is concerned with a control rod spider assembly incorporating secure attachment joints for fastening the control rods to the spider structure.

2. Related Art

In a typical nuclear reactor, such as a pressurized water reactor (PWR) type, the reactor core includes a multiplicity of fuel assemblies. Each fuel assembly is composed of top and bottom nozzles with a plurality of elongated transversely spaced guide thimbles extending longitudinally between and attached at opposite ends to the nozzles. A plurality of transverse support grids are axially spaced along and attached to the guide thimbles. A plurality of elongated fuel elements or rods transversely spaced apart from one another and from the guide thimbles are supported by the transverse grids between the top and bottom nozzles. The fuel rods each contain fissile material and are grouped together in an array which is organized so as to provide a neutron flux in the core sufficient to support a high rate of nuclear fission and thus the release of a large amount of energy in the form of heat. A liquid coolant is pumped upwardly through the core in order to extract some of the heat generated in the core for the production of useful work.

Since the rate of heat generation in the reactor core is proportional to the nuclear fission rate, and this, in turn, is determined by the neutron flux in the core, control of heat generation at reactor start-up, during its operation and at shutdown is achieved by varying the neutron flux. Generally, this is done by absorbing excess neutrons using control rods which contain neutron absorbing material. The guide thimbles, in addition to being structural elements of the fuel assembly, also provide channels for insertion of the neutron absorber control rods within the reactor core. The level of neutron flux and thus the heat output of the core is normally regulated by the movement of the control rods into and out of the guide thimbles.

One common arrangement utilizing control rods in association with a fuel assembly can be seen in U.S. Pat. No. 4,326,919 to Hill. This patent shows a control rod spider assembly which includes a plurality of control rods and a spider structure supporting the control rods at their upper ends. The spider structure, in turn, is connected to a control drive mechanism that vertically raises and lowers (referred to as a stepping action) the control rods into and out of the hollow guide thimbles of the fuel assembly. The typical construction of the control rod used in such an arrangement is in the form of an elongated metallic cladding tube having a neutron absorbing material disposed within the tube and with end plugs at opposite ends thereof for sealing the absorber material within the tube.

The spider structure typically includes a plurality of radially extending vanes supported on and circumferentially spaced about a central hub. The vanes are flat metal plates positioned on edge and being connected at their inner ends to the central hub. Cylindrical shaped control rod connecting fingers are mounted to and are supported by the varies, with some of the vanes having only a single connecting finger and other vanes having a spaced pair of connecting fingers associated therewith.

Typically, the upper end plug of each control rod has a threaded outer end which is receivable into a bore in the lower portion of one finger of the spider structure and threadable into a lapped hole formed in the finger at the inner end of the bore. The end plug is then secured or locked therein by a key or pin inserted into the side of the finger and the end plug and then welded therein, as more particularly described in U.S. Pat. No. 4,855,100.

The current design has performed quite well for several years, but in a few instances, control rodlets have been dropped during operation of the reactor. A dropped rodlet is a very undesirable event and has potential for significant safety implications. Root cause evaluations have been completed on these dropped rodlet incidents and it has been determined that the rodlets were dropped because of inadequacies in the anti-rotation features of this design. The anti-rotation features comprise a hole drilled through the finger into the rodlet end plug extension and a pin is installed and welded to prevent the rodlet from unscrewing. There are several disadvantages to this approach. First, the threads in the finger are in the top of a blind hole, which means that any burr chip or nick in the thread may cause the joint not to be preloaded properly and potentially leave the joint susceptible to fatigue and failure. Secondly, assembly is slow because holes for each rodlet must be drilled during assembly. Thirdly, holes must be drilled for each rodlet to a tight tolerance depth so that the pin engages the thin finger wall. If not done properly, the rodlet can turn and become disengaged from the assembly (there have been past issues with dropped rodlets because the hole was drilled too deeply.) Fourthly, the small pin is difficult to handle. Additionally, if the locking weld is not correct for any rodlet, then there is an increased possibility of scrapping an assembly.

Accordingly, a new design is desired that will assure that the threaded joint of the control rod is preloaded as designed during manufacture. Additionally, a new design is desired that will provide assurance that the rodlet will not become disengaged during operation. Furthermore, a new design is desired that will improve manufacturing and reduce cost and assembly time. In addition, a new design is required that will improve quality control inspection and not risk distorting the rodlet flex joint during assembly.

SUMMARY OF THE INVENTION

The present invention provides a control rod spider assembly designed to satisfy the aforementioned needs. The control rod spider assembly of the present invention employs a mechanical attachment joint for fastening each of the control rods to the spider structure. The attachment joint is simple aid is relatively easy to reconstitute.

In a general sense the present invention provides a control assembly including a spider structure, at least one control rod and an attachment joint for detachably fastening the control rod to the spider structure. The attachment joint comprises: (a) a hollow connecting finger of the spider structure, the hollow bore of the connecting finger having a reduced diameter upper section and a downwardly lacing ledge at the transition to the reduced diameter upper section; (b) an elongated control rod end plug having a reduced diameter upper section with a lip formed at the transition to the reduced diameter section and a first fastener profile formed along an upper portion of the reduced diameter section with one of either a right hand or a left hand locking contour and a second fastener profile on an intermediate section of the elongated end plug that mates with a corresponding profile on the interior of the connecting finger, that has the other of the right hand or left hand locking contour; (c) a fastener mechanism having a corresponding fastener profile and coupling with at least a portion of the first fastener profile of the upper end plug once the upper end plug has been inserted through the connecting finger, the second fastener profile is engaged with the corresponding fastener profile on the interior of the connecting finger and the downwardly facing ledge of the finger rests against the lip on the elongated control rod end plug; and (d) an anchoring mechanism for rotationally affixing the fastener mechanism to one or both of the connecting finger or the upper end plug and completing the attachment joint between the connecting finger of the spider structure and the upper end plug of the control rod.

Accordingly, one embodiment the present invention provides a control assembly including a spider structure, at least one control rod and an attachment joint for detachably fastening the control rod to the spicier structure. The attachment joint comprises: (a) a hollow connecting finger of the spider structure, the hollow bore of the connecting finger having a reduced diameter upper section and a downwardly facing ledge at the transition to the reduced diameter upper section; (b) an elongated control rod end plug having a reduced diameter upper section with a first fastener profile, with one of either a right hand or a left hand locking contour on the exterior surface thereof and a second fastener profile on an intermediate section of the elongated end plug that mates with a corresponding profile on the interior of the connecting finger, that has the other of the right hand or left hand locking contour; (c) a fastener mechanism inserted over at least a portion of the first fastener profile of the upper end plug once the upper end plug has been inserted through the connecting finger and the second fastener profile is engaged with the corresponding fastener profile on the interior of the connecting finger; and (d) an anchoring mechanism for rotationally affixing the fastener mechanism to one or both of the connecting finger or the upper end plug and completing the attachment joint between the connecting finger of the spider structure and the upper end plug of the control rod.

More particularly, in one preferred embodiment, the hollow-connecting means has a central bore defined therethrough from a bottom end to atop end thereof. An upper end portion of the bore is smaller in diameter than a bottom portion of the bore so as to define a downwardly facing annular shoulder on the interior of the connecting finger between the bottom and top end portions. Preferably the elongated upper end plug of the control rod has the reduced diameter upper axial portion with the male or female fastener profile formed on or along its axial section extending substantially above the top end of the connecting finger when the upper end plug is inserted through the connecting finger from the bottom end thereof. Desirably, the intermediate fastener section of the elongated upper end plug mates with the corresponding fastener profile on the interior of the connecting finger just below the downwardly facing annular shoulder when the upper end plug is inserted through the connecting finger from the bottom end thereof.

In another preferred embodiment, the fastener profile on the reduced diameter upper section of the upper end plug and the intermediate fastener profile are threaded with tire reduced diameter fastener profile having one of either aright hand thread or left hand thread and the intermediate fastener profile having the other of either the right hand thread or left hand thread.

The advantages and attainments of the present invention will become apparent to those skilled in the art upon a reading of the following detailed description, when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 4 is an enlarged fragmentary view, with parts partially sectioned and broken away, of a spider structure of the control assembly of FIG. 3.

FIG. 5 is a cross-sectional fragmentary view of a vane and control rod connecting finger of the spider structure taken along line 5-5 of FIG. 4.

FIG. 6 is a cross-sectional view of the connecting finger taken along line 6-6 of FIG. 4.

FIG. 7 is an enlarged fragmentary view of one control rod of the control assembly of FIG. 3, illustrated the upper end plug thereof.

FIG. 8 is an enlarged fragmentary view, with parts partially sectioned and broken away, of the control assembly of FIG. 3, illustrating a prior art attachment joint between the control rod connecting finger on one vane of the spider structure of the control assembly and the upper end plug of one of the control rods thereof.

FIG. 9 is a cross-sectional view of the upper end plug inserted in the connecting finger taken along line 9-9 of FIG. 8, illustrating a pin locking the end plug and finger together.

DESCRIPTION OF THE PREFERRED EMBODIMENTS

Figure 1:
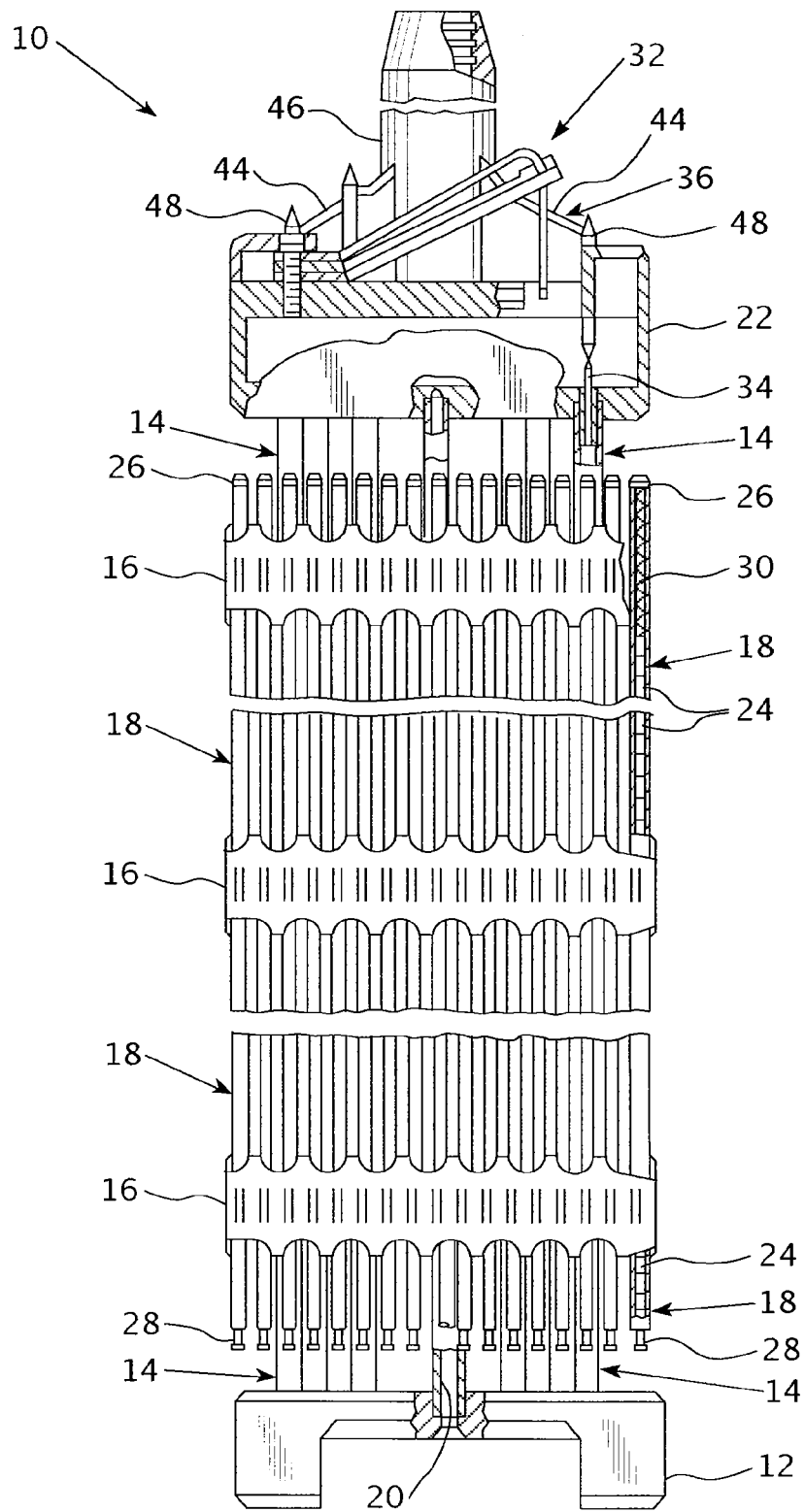
FIG. 1 is a side elevational view, with parts partially sectioned and broken away for purposes of clarify, of a prior art fuel assembly having a prior art control rod spider assembly being disposed above the fuel assembly.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Referring now to the drawings, and particularly to FIG. 1, there is shown an elevational view of a nuclear reactor fuel assembly, represented in vertically foreshortened form and being generally designated by the numeral 10. Being the type used in a PWR, the fuel assembly 10 basically includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 removably attached to the upper ends of the guide thimbles 14 to form an integral assembly capable of being conventionally handled without damaging the assembly parts.

As mentioned above, the fuel rods 18 in the array thereof in the assembly 10 are held in spaced relationship with one another by the grids 16 spaced along the fuel assembly length. Each fuel rod 18 includes nuclear fuel pellets 24 and the opposite ends of the rod are closed by upper and lower end plugs 26, 28 to hermetically seal the rod. Commonly, a plenum spring 30 is disposed between the upper end plug 26 and the pellets 24 to maintain the pellets in a tight, stacked relationship within tire rod 18. The fuel pellets 24 composed of fissile material are responsible for creating the reactive power of the nuclear reactor. A liquid moderator/coolant such as water, or water containing boron, is pumped upwardly through the fuel assemblies of the core in order to extract heat generated therein for the production of useful work.

Prior Art Control Rod Spider Assemblies

Figure 2:
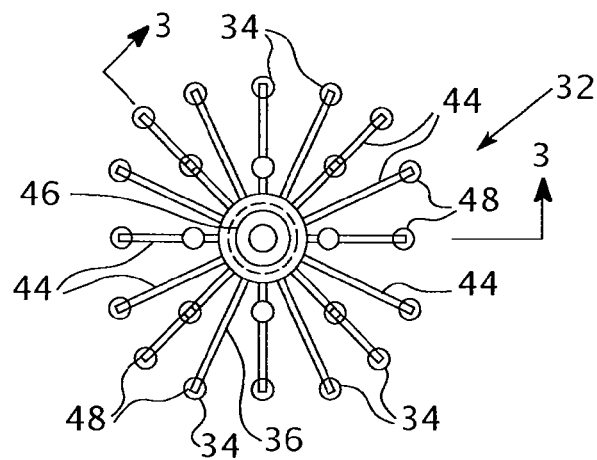
FIG. 2 is a top plan view of the control rod spider assembly removed from the fuel assembly of FIG. 1.
Figure 3:
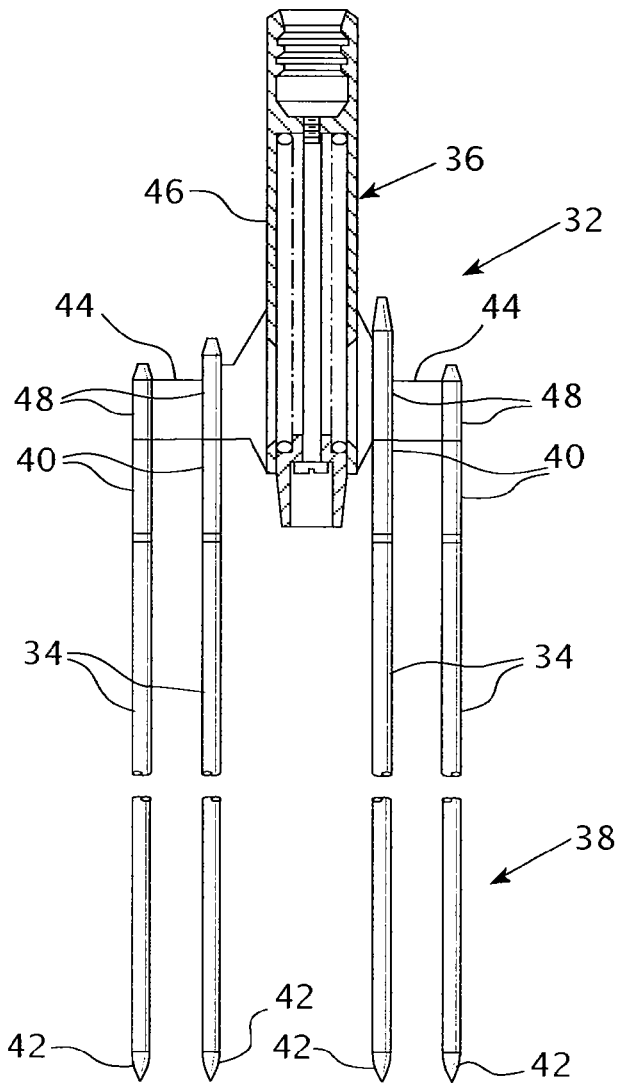
FIG. 3 is an elevational view, with parts partially sectioned, of the control assembly as seen along line 3-3 of FIG. 2.

Turning now to FIGS. 2 and 3 as well as FIG. 1, there is shown a typical embodiment of a conventional control rod spider assembly, generally designated 32, designed for use in the conventional fuel assembly 10 of FIG. 1. In its basic components, the control assembly 32 includes a plurality of control rods 34 and a spider structure 36 which supports the control rods at their upper ends. The spider structure 36 holds the control rods 34 in a pattern matched to that of the guide thimbles 14 which adapts them to be inserted through the top nozzle 22 and downward through the guide thimbles 14 of the PWR fuel assembly 10. The spider structure 36 is connected to a control mechanism (not shown) which is operable in a known manner to move the control rods 34 so as to regulate core power.

In a typical construction, each control rod 34 of the control assembly 32 is composed of an elongated metallic cladding tube 38 having a neutron absorbing material disposed therein and upper and lower end plugs 40, 42 attached at opposite ends of the cladding tube 38 for sealing the absorber material therewithin. The spider structure 36 of the control assembly 32 typically includes a plurality of radially extending flukes or vanes 44 supported on and circumferentially spaced about a central hub 46. Cylindrical shaped control rod connecting fingers 48 are mounted to and supported by the vanes 44. Some of the vanes 44 have only a single connecting finger 48 attached thereon, whereas other vanes 44 have a spaced pair of connecting fingers 48 associated therewith.

Turning now to FIGS. 4-9, there is illustrated one prior art attachment joint, generally indicated by the numeral 50, provided between each control rod connecting finger 48 on the vane 44 of the control assembly spider structure 36 and the upper end plug 40 of each control rod 34. Typically, the upper end plug 40 of each control rod 34 has a threaded outer end 52. Each connecting finger 48 is mounted to the vane 44 in a bayonet-type of welded connection, and has an axial bore 54 formed in a lower portion 56 thereof with a smaller-diameter threaded hole 58 tapped therein at the inner end of the bore 54. The threaded outer end 52 of the upper end plug 40 is threadably received in the tapped hole 58 when the plug 40 is received within the axial bore 54. The end plug 40 is secured or locked therein by a key or pin 60 inserted through aligned holes 62, 64 in the sides of the finger 48 and end plug 40 and then welded thereto. Parenthetically, it should be pointed out that the axial bore 54 terminates at the start of an upper portion 66 of each connecting finger 48 where the finger connects with the vane 44.

A major disadvantage of this conventional control assembly 32 is that it is not reconstitutable; that is, the assembly 32 cannot readily be taken apart and have worn or damaged components thereof replaced. Instead, the whole assembly has to be discarded. Furthermore, as previously mentioned, the prior art joint is difficult to accurately manufacture and has resulted in a few dropped rods.

However, as mentioned earlier, control rod spider assemblies having removable control rods are known in the prior art. One recent control rod spider assembly that is reconstitutable is disclosed in the aforecited French patent application No. 86/08381. Similar to the above-described prior art control assembly, the French control assembly includes a spider structure with connecting fingers on vanes and a plurality of control rods with upper end plugs having a threaded outer end. However, the attachment joint employed to secure each control rod to one connecting finger is modified somewhat from that described above. Each connecting finger of the French control assembly has an axial bore extending therethrough from end to end. When the upper end plug of one control rod is inserted through the axial bore, its threaded outer end extends above the top end of the finger. A fastener or nut is threaded onto the outer end of the control rod upper end plug until it contacts the top end of the finger. Then a tubular locking cup formed on the control rod upper end plug above the threaded outer end and extending above the threaded nut is deformed radially outward to lock within a groove in the nut to retain the nut thereon.

However, disadvantageously, to remove the control rod from the spider structure, the portion of the end plug which includes the threaded outer end with the nut fastened thereon must first be severed or cut off. Thus, the fastening nut must be replaced after removal and the removed control rod with the partially severed upper end plug must be replaced.

Control Rod Spider Assembly of the Present Invention

This invention replaces the welded pin 60, shown in FIG. 9, with a separate cap with a thread that is opposite to the thread located in the rod cluster control assembly spider connecting finger. The control rod, sometimes referred to as a rodlet, and cap can be locked together by using a locking feature in the cap such as a helicoil or prevailing torque friction feature, such as the torque friction lock nut sold by Emhart Teknologies, a Black & Decker company, Shelton, Conn., that employ distorted threads incorporated in crown or side lock nut, or the opposite threaded cap can be tack welded to the connecting finger and/or end plug after it is installed on the extended end plug of the rodlet. The rodlet is not able to unscrew once the cap is locked by the locking feature, because the cap with opposite threads prevents rotation in one direction and the connecting finger with standard threads prevents rotation in the other direction. This design provides for simple installation and inspection and provides for a very secure rodlet retention.

Figure 10:
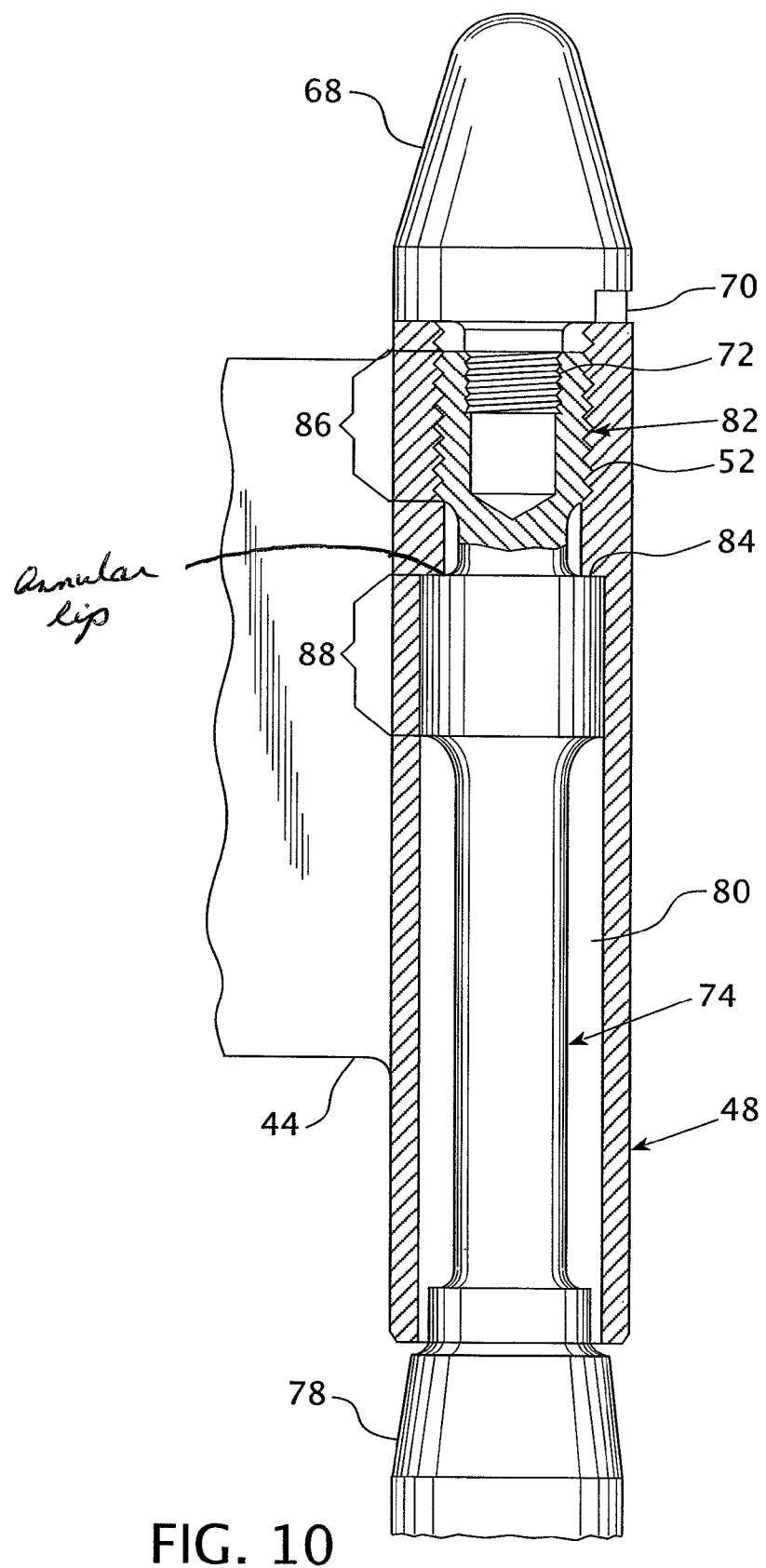
FIG. 10 is a perspective view of one embodiment of this invention, partially cut away, showing a connecting finger and control rod upper end plug with an attachment mechanism with a male thread securing the upper end plug to the connecting finger.

FIG. 10 shows the terminal end of a spider vane 36 connected to a hollow connecting finger 48 that has a control rod end plug extension 78 secured therein. The connecting finger 48 has a bore 80 that extends therethrough with a necked down reduced diameter upper section 82 that defines a downwardly facing annular shoulder 84 on the interior of the connecting finger 48 between the bottom and top portions of the connecting finger. The reduced diameter upper portion of the interior bore includes a threaded profile on the surface of the bore, for example, a right hand thread. The end plug extension 78 similarly includes a reduced diameter section 82, at least a portion of which is threaded. A lower portion 88 of the end plug extension 78 extends out radially to the full diameter of the lower bore 80 and, in the preferred embodiment, has a lip defined by the transition between the section 88 and the reduced diameter section 82 that rests up against the downwardly-facing annular shoulder 84 on the interior of the connecting finger 48 when the thread 86 on the reduced diameter section 82 is engaged. A second reduced diameter portion 74 in the lower portion of the end plug extension 78, referred to as a flex joint, is provided to permit control rod deflection to minimize loading and wear on the fuel assembly, reactor structures and control rod assembly. A nose cap 68 is employed to capture the end plug extension 82 within the interior of the bore of the connection finger 48. If the thread 86 on the reduced diameter section of the end plug extension 82 is a right hand thread, then the shank 72 on the nose cap screw 68 has a left hand thread, or vice versa. After the nose cap screw 68 is in place, the nose cap screw is tack welded at 70 to the connecting finger 48 so that any rotation of the control rod either tightens the thread interface 86 between the end plug extension 78 and the bore 80 of the connecting finger 48 or the nose screw shank 72 interface with the upper interior of the end plug extension.

It should be appreciated from the foregoing description that the threads between the interior of the bore 80 and the end plug extension 78 may be moved from the reduced diameter section 82 to the lower portion of the end plug extension 88 or elsewhere along the end plug extension that closely interfaces the interior of the bore 80. Furthermore, while screw fasteners have been described as the fastening mechanism for this embodiment it should be appreciated that other fastening mechanisms may be employed. For example, the fastening mechanism may be a bayonet connection with one fastening interface having a right hand engagement while the other employs a left hand engagement. In the same regard, the control rod and nose cap can be locked together to prevent rotation using other alternate locking features such as a helicoil or a prevailing torque friction feature, for example.

Figure 11:
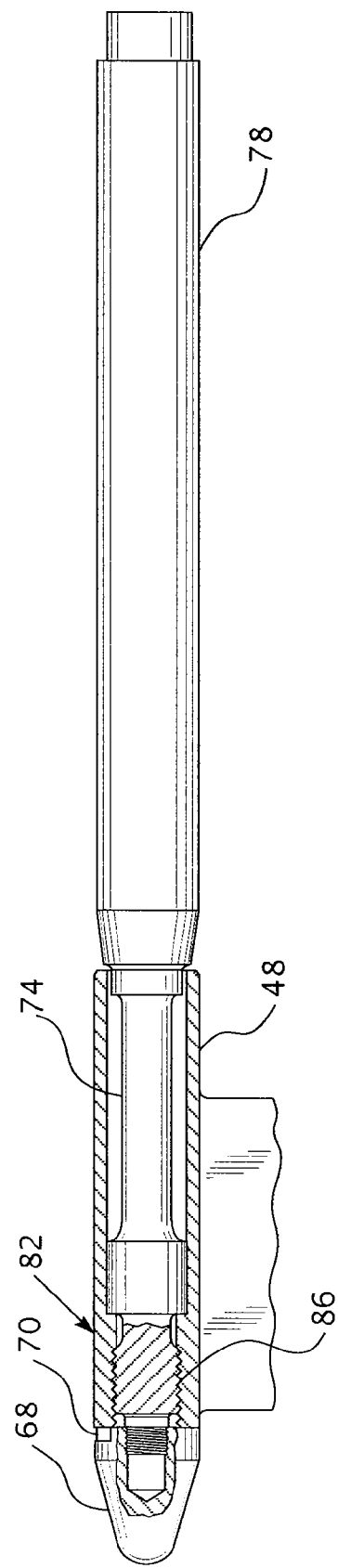
FIG. 11 is a plan view of a second embodiment of this invention, partially cut away, showing the control rod upper end plug, the connecting finger and an attachment mechanism with a female thread securing the upper end plug.

Additionally, alternatives are available for the nose cap screw 68 that can perform the same function. FIG. 11 illustrates such an example. The control rod connecting finger illustrated in FIG. 11 is in large part the same as that illustrated in FIG. 10, except for the upper portion of the end plug extension 78 that is above the reduced diameter section 82. This upper portion above the reduced diameter portion 82 has a further reduced diameter that is threaded on the exterior thereof at an elevation above the reduced diameter section 82. This upper threaded section having the further reduced diameter is captured within the nose cap screw 68 which has a mating internal thread with both the threads on the nose cap 68 and further reduced diameter section of the end plug having an opposite engagement direction than the thread 86. Thus, the nose cap 68 in the embodiment illustrated in FIG. 11 takes the form of a nut that may be tack welded at 70 to the connection finger 72, or otherwise restrained as mentioned above.

Thus the design of this invention provides a secure connection between the connecting finger and the control rod, while enabling reconstitution with minimal effort and with negligible waste. For example, the connection may be readily broken by grinding out the tack weld 70 and unscrewing the nose cap 68.

While specific embodiments to the invention have been described in detail, it will be appreciated by those skilled in the art that various modifications and alternatives to those details could be developed in light of the overall teachings of the disclosure. For example, the internal bore 80 of the connecting finger 48 can be constructed with a single diameter from its lower end to just above its upper end with an annular lip at its terminal upper end. The end plug extension 78 can similarly have a single diameter that is closely received within the internal bore 80 and be captured by nose cap screw 68 that is seated above the annular lip on the top of the connecting finger 48. Accordingly, the particular embodiments disclosed are meant to be illustrative only and not limiting as to the scope of the invention which is to be given the full breadth of the appended claims and any and all equivalents thereof.

What is claimed is:

1. A control rod spider assembly for use with a nuclear fuel assembly, said control rod spider assembly including a spider structure and at least one control rod, an attachment joint for fastening the control rod to the spider structure, said attachment joint comprising:
   a hollow connecting finger of said spider structure having a central bore defined therethrough from a bottom end to a top end thereof, an upper end portion of said bore being smaller in diameter than a bottom portion of said bore so as to define a downwardly facing annular shoulder on the interior of said finger between said bottom and top end portions;
   an elongated upper end plug of said control rod having a first upper axial, reduced diameter portion with a male or female fastener profile formed on or within an axial section thereof, at least a portion of said upper axial reduced diameter portion fastener profile extending substantially to or through said top end of said connecting finger when the upper end plug is inserted through said connecting finger from said bottom end thereof and said elongated upper end plug having a second axial portion having a male fastener profile formed on or along an axial section of the exterior thereof that mates with a corresponding female profile on an interior wall of the connecting finger when the upper end plug is inserted through the connecting finger from said bottom end thereof, the second axial portion fastener profile having one of either a right hand or a left hand oriented closure and the reduced diameter upper axial portion fastener profile having the other of the right hand or left hand oriented closure;
   fastening means insertable to engage at least a portion of said upper reduced diameter axial fastener profile section of said upper end plug once said upper end plug has been inserted through said connecting finger and the upper end plug lower portion fastener profile is engaged with the corresponding fastener profile on the connecting finger, said fastening means having an internal fastener profile that mates with the fastener profile on the upper end plug reduced diameter upper axial portion when engaged; and
   anchoring means for rotationally affixing the fastener means to the connecting finger.

2. The control rod spider assembly of claim 1 wherein the anchoring is rotationally secured to the connecting finger with a mechanical connection.

3. The control rod spider assembly of claim 1 wherein the anchoring is rotationally secured to the connecting finger with a metallurgical connection.

4. The control rod spider assembly of claim 3 wherein the metallurgical connection is a tack weld.

5. The control rod spider assembly of claim 1 wherein the first upper axial, reduced diameter portion fastener profile of the upper end plug and the second axial portion fastener profile of the upper end plug are threaded with the first upper axial, reduced diameter portion fastener profile having one of either a right hand thread or left hand thread and the second axial portion fastener profile having the other of either the right hand thread or left hand thread.

6. The control rod spider assembly of claim 1 wherein the anchoring means is a locking cap and the locking mechanism is either a helicoil or a prevailing torque friction feature.

7. The control rod spider assembly of claim 1 wherein the first upper axial, reduced diameter portion of the elongated upper end plug defines an annular lip between the first upper axial, reduced diameter upper axial portion and the second axial portion of the elongated upper end plug, wherein the annular lip seats against the annular shoulder when the second axial portion fastener profile and the corresponding profile on the interior wall of the connecting finger are engaged.

8. The control rod spider assembly of claim 7 wherein the first upper axial, reduced diameter portion fastener profile extends substantially above the top end of the connecting finger when the upper end plug is inserted through the connecting finger from the bottom end thereof and is captured above the connecting finger by the fastening means.

9. The control rod spider of claim 1 wherein the fastening means is a male fastener that is captured within the fastener profile in the first upper axial, reduced diameter portion of the elongated upper end plug.

10. A control rod cluster control assembly comprising:
a control rod;
a hollow connecting finger for connecting the control rod to the cluster control assembly, the connecting finger having a central bore defined therethrough from a bottom end to a top end thereof, an upper end portion of said bore being smaller in diameter than a bottom portion of said bore so as to define a downwardly facing annular shoulder on the interior of said connecting finger between said bottom and said top end portions;
an elongated upper end plug of said control rod having an axis along its elongated dimension and a first fastener contour at a first axial portion of said upper end plug with one of either a male or female profile and one of either a right hand or left hand engagement, said elongated upper end plug having a second axial portion with a second fastener contour with a male profile and the other of either the right hand or left hand engagement, the second fastener mating with a complementary fastener profile on a wall of the interior of the bore of the connecting finger;
a fastening mechanism having a complementary fastener profile to the first fastener contour; and
means for anchoring the fastener mechanism to the connecting finger.

\* \* \* \* \*